Nov. 3, 1964   A. KEEL   3,155,047
POWER TRANSMISSION
Filed March 15, 1962
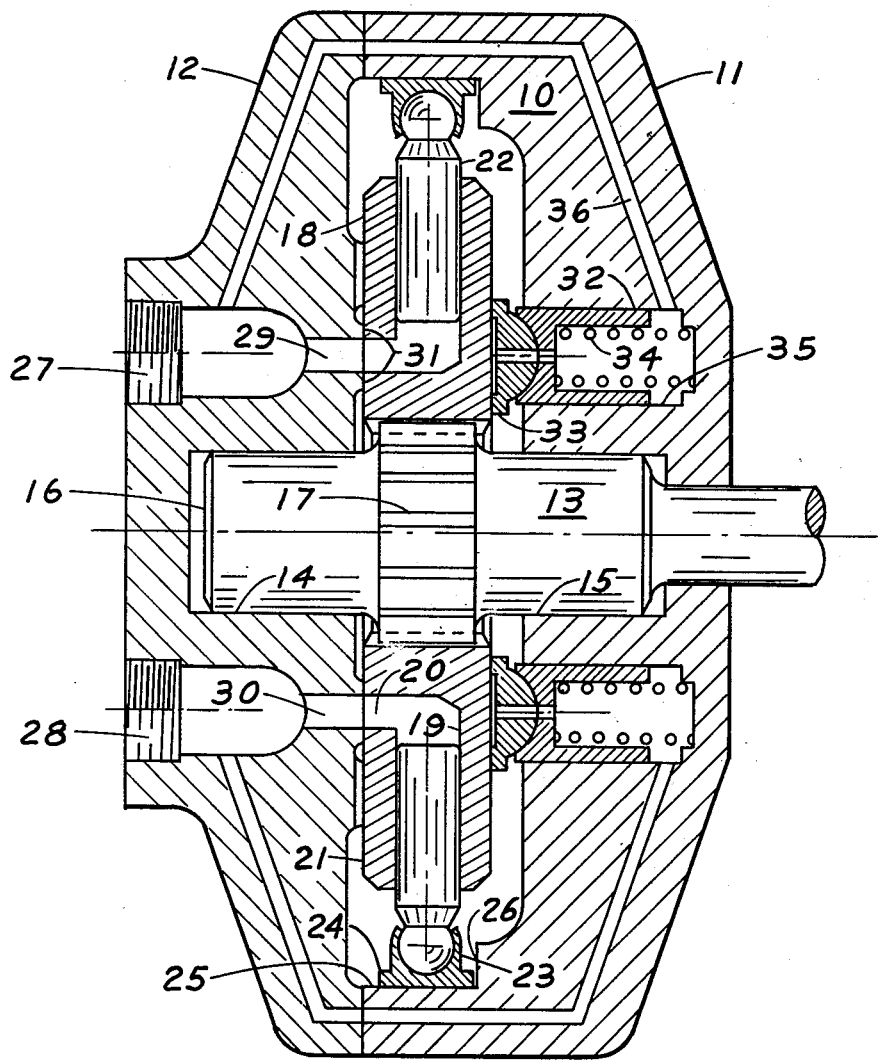
INVENTOR
Adolf Keel

3,155,047
POWER TRANSMISSION
Adolf Keel, 164 California Ave., Highland Park, Mich.
Filed Mar. 15, 1962, Ser. No. 179,924
4 Claims. (Cl. 103—161)

This invention relates to power transmissions and is particularly applicable to those of the type comprising two or more fluid pressure energy translating devices, one of which may function as a pump, and another as a fluid motor.

More specifically, the invention refers to such fluid pumps and motors which embody a drive shaft supported rotating cylinder block, a number of radially arranged pistons, and fluid pressure balanced face type valving surfaces.

It is the object of this invention to combine in a unit of this type the advantages of pressure balanced face type valving surfaces with that of radially arranged pistons in order to provide a dependable and low cost unit capable of operating at high pressures. The advantage of pressure balanced face type valving surfaces lies in the possibility of maintaining a fluid film of optimum variable thickness between a face of the rotating cylinder block and a stationary valving surface. One advantage of radially arranged pistons is that no involved mechanical devices are required to retract them, as in the case of axial piston units, but that the centrifugal force induced by the rotation of the cylinder block can be utilized for this purpose. This is a feature which contributes importantly to the simplicity and dependability of a unit. Another advantage of radially arranged pistons is that they do not induce upon the cylinder block any force couples which tend to separate the valving surfaces. This implies that the forces which must be employed to hold the rotating cylinder block against the stationary valving surface can be kept at a minimum.

Another object of the invention is to provide a simple cylinder block suspension in which both the transverse loads and the driving torque are absorbed by the drive shaft.

It is the principal object of this invention to provide fluid pressure means for holding the rotating cylinder block against a stationary valving surface in a simple, original manner which insures proper contact of the valving surfaces regardless of pressure fluctuations.

The nature of the present invention is clearly shown in the accompanying drawing which is a section along the drive shaft axis of a basic unit where such details as are not pertinent to the invention have been omitted for the sake of simplicity.

In the drawing the housing 10, comprising body 11 and head 12, contains the rotary pumping mechanism generally designated 13. Parts 11 and 12 are bolted together and are so machined as to provide bearings 14 and 15 for drive shaft 16. Cylinder block 18 is provided with a splined bore which fits slidably over a splined portion 17 of the drive shaft, and with a number of radially arranged bores 19, each of which has an outlet port 20 on face 21 of the cylinder block. This face is in sliding contact with the unit head 12 whose inner surface is serving as a stationary valving surface for the unit as well as a thrust bearing for the cylinder block. Each cylinder bore houses a piston 22 which at its outer end has the shape of a partial sphere to which a thrust shoe 23 is attached to effect a movable ball joint. The pad 24 of this shoe which is in sliding contact with diameter 25 of body 11 is roughly rectangular in outline, and its contacting surface forms a partial cylinder. Its rotation about the axis of the piston is limited by the shoulder 26 which is in close proximity to one side of the rectangular pad.

Unit head 12 is provided with ports 27 and 28 which communicate with valving slots 29 and 30 respectively.

Rotation of cylinder block 18 induces a centrifugal force upon the piston—and thrust shoe assemblies, and causes them to ride against diameter 25 which is located eccentrically with respect to the axis of the drive shaft. This eccentricity imposes a reciprocating radial motion upon the pistons, the direction of which is alternately away from and toward the shaft axis during each successive 180 degrees of shaft rotation. Such reciprocating radial motion of the pistons obviously causes changes in the volume of the cylinders 19, and produces movement of fluid thru the ports 20 and the communicating valving slots 29 and 30. These slots are so positioned on the face of unit head 12 that one of them communicates with all the pistons moving away from center, and the other with all the pistons moving toward center. In this manner a continuous flow is established thru ports 27 and 28, one of them becoming the inlet and the other the outlet port.

Let it be assumed now that the unit is operating as a pump, that port 27 is the outlet port, and 28 becomes the inlet port, assumed to be at atmospheric pressure. Under this condition the inwardly moving pistons are continuously expelling fluid thru valving slot 29. If this fluid is under any pressure, this pressure will be transmitted to some extent to the fluid film existing between the sealing surfaces 31 which border valving slot 29. This pressure acting on the sealing lands, in addition to the pressure in the valving slot 29 acting against cylinder block 18, will result in a force tending to separate the rotating cylinder block from the stationary valving surface. In order to prevent such a separation, and to hold the cylinder block against the valving surface with just enough force required for this purpose, a number of fluid pressure actuated balancing plungers 32 are provided. Each of these plungers acts upon a thrust shoe 33 thru which it exerts fluid pressure upon the cylinder block. These stationary thrust shoes are in sliding contact with the rotating cylinder block. The mating surfaces between plunger and thrust shoe are spherical in order to compensate for slight misalignment. Each balancing plunger is provided with a spring 34 which pushes plunger and thrust shoe toward the cylinder block in order to establish initial contact between the valving surfaces. The balancing plungers 32 are slidably mounted in bores 35 whose closed ends are connected with outlet port 27 by means of a passage 36. Thus any pressure fluctuation in outlet port 27 is transmitted to the rear ends of the balancing plungers 32. The forces tending to separate the valving surfaces are directly proportional to the pressure in port 27, but the forces exerted upon the cylinder block by the balancing plungers in the opposite direction to the separating forces also are directly proportional to the same pressure. In this manner, by selecting of suitable sizes and locations of the balancing plungers, means are provided to hold the sliding valving surfaces together with an automatically variable optimum force for a wide range of operating pressures.

In such units where pressure fluctuations occur in only one port, balancing plungers need be positioned opposite to the valving surface of that port only, whereas in units where significant pressure changes occur in both ports, a separate set of balancing plungers is required for each valving area.

Thus it may be seen that the present invention represents a novel and improved type of fluid pressure pump or motor of a simple, dependable construction which combines the advantages of radially arranged pistons with those of face type valving surfaces.

While the form of embodiment of the invention disclosed herein constitutes a preferred form, it is to be understood that other forms might be adopted, all coming within the scope of the claims which follow.

What I claim is as follows:

1. In a hydraulic pump or motor of the radial piston type the combination of a housing having a drive shaft journalled therein, a cylinder block mounted slidably on said drive shaft and keyed to it for positive rotation, means forming a stationary plane valving surface on the interior of said housing at right angles to the drive shaft axis, port openings on said stationary valving surface to permit flow of fluid to and from said cylinder block, a rotary valving surface on said cylinder block on the side facing said stationary valving surface on the interior of the housing, axially slidable fluid pressure responsive bearing means also on the interior of the housing but opposite to said stationary valving surface, said axial bearing means slidably engaging the cylinder block and urging it toward said stationary valving surface in opposition to the forces tending to separate the rotating cylinder block from the stationary valving surface, said axial bearing means being divided into two separate sections, one section acting in opposition to separating forces existing in the valving area of one port opening on said stationary valving surface and being in direct and uninterrupted communication with this port opening, and the second section acting in opposition to separating forces existing in the valving area of a second port opening on said stationary valving surface and being in direct and uninterrupted communication with that second port opening.

2. In a hydraulic pump or motor having a drive shaft the combination of a rotatable cylinder block having a plurality of substantially radial cylinder bores, a housing providing a stationary plane valving surface on its interior and at right angles to the axis of the drive shaft, port openings on said stationary valving surface to permit the passage of fluid to and from said rotatable cylinder block, a rotary plane valving surface on the cylinder block with individual ports facing said stationary valving surface, one port for each of the cylinder bores, a plurality of fluid pressure responsive axial pistons slidably mounted in the interior of said housing opposite to the said stationary valving surface and carrying means for slidably engaging said cylinder block and urging it toward said stationary valving surface in opposition to the separating forces existing between said stationary valving surface and said rotary valving surface on the cylinder block, said axial pistons being arranged in two groups with each one of the two groups having its combined center of pressure located directly opposite the center of pressure of a valving area on said stationary valving surface, or having the center of pressure of one or both of the groups of pistons so located as to form a couple by the force of one group of pistons and the separating force of the opposing valving area in order to neutralize an externally imposed couple upon the cylinder block and thus establish a uniform load distribution over the valving surfaces, all of said axial pistons of one such group being actuated by the fluid pressure prevailing in one of the port openings on said stationary valving surface and having a common and uninterrupted passage to this port opening, and all of the axial pistons of the second such group being actuated by the fluid pressure existing in a second port opening on said stationary valving surface and having a common and uninterrupted fluid passage to that port opening.

3. In a hydraulic pump or motor the combination of a housing, a rotatable shaft journalled therein, means forming a stationary plane valving surface on the inside of the housing at right angles to the drive shaft axis, passages from port openings on said stationary valving surface to the inlet and outlet ports of said pump or motor, a cylinder block slidably mounted on said drive shaft by means of a central thru bore and keyed to the shaft for positive rotation, said cylinder block having a plurality of substantially radial cylinder bores and at the end facing the said stationary valving surface on the inside of said housing having a rotary valving surface, a plurality of individual ports on said rotary valving surface, each of said ports with a separate passage to one of the said cylinder bores, means forming a continuous bearing surface on said cylinder block parallel to said rotary valving surface but at the opposite end of said cylinder block and having no ports leading to any cylinder bores, and axially movable fluid pressure responsive bearing means disposed in said housing opposite to the said stationary valving surface and being in sliding contact with the said bearing surface on the cylinder block, said bearing means urging the cylinder block toward the stationary valving surface on the interior of the housing and being selectively and sectionally applicable to counteract specific pressure areas on the said stationary valving surface and being divided into two separate independent sections, one section to counteract separating forces originating from one port opening on said stationary valving surface and being in direct and continuous communication with this port opening, and the second section to counteract separating forces originating from a second port opening on said stationary valving surface and being in direct and continuous communication with that port opening.

4. In a hydraulic pump or motor the combination of a housing, a rotatable drive shaft journalled therein, means forming a stationary plane valving surface on the interior of said housing in a plane normal to the drive shaft axis, port openings on said stationary valving surface with passages to the inlet and outlet port of said pump or motor, a rotatable cylinder block slidably mounted on said drive shaft on a central thru bore and keyed to its for positive rotation, said cylinder block having a plurality of substantially radial cylinder bores and on the side facing the said stationary valving surface on the interior of the housing having a rotary valving surface, said rotary valving surface having a plurality of port openings, a passage from each of the latter port openings to one of the said cylinder bores, means forming a continuous bearing surface on said cylinder block parallel to the said rotary valving surface but on the opposite side of the block from the rotary valving surface and having no ports leading to any cylinder bores, a plurality of fluid pressure responsive balancing pistons disposed on the interior of said housing normal and opposite to said stationary valving surface, each of said balancing pistons being in sliding contact wih the said bearing surface on the cylinder block by means of a fluid pressure balanced bearing head attached to the piston with a spherical joint, said balancing pistons urging the cylinder block in the direction of the said stationary valving surface on the interior of the housing and being divided into two groups, one group of said pistons acting upon the rotating cylinder block oppositely the valving area of one port opening on the said stationary valving surface and having a common and uninterrupted fluid passage to this port opening, and the second group of said pistons acting upon the rotating cylinder block oppositely the valving area of another port opening on the said stationary valving surface and having a common and uninterrupted fluid passage to that port opening.

References Cited in the file of this patent

UNITED STATES PATENTS

| | | |
|---|---|---|
| 1,621,495 | Conradson | Mar. 22, 1927 |
| 2,620,736 | Overbeke | Dec. 9, 1952 |
| 3,010,405 | Tomell | Nov. 28, 1961 |
| 3,986,477 | Ruhl | Apr. 23, 1963 |

FOREIGN PATENTS

| | | |
|---|---|---|
| 321,313 | Great Britain | July 17, 1929 |